(12) United States Patent
Snyder et al.

(10) Patent No.: US 10,730,635 B1
(45) Date of Patent: Aug. 4, 2020

(54) ENGINE WING

(71) Applicant: United Technologies Corporation, Farmington, CT (US)

(72) Inventors: Timothy S. Snyder, Glastonbury, CT (US); Steven H. Zysman, Amston, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/574,424

(22) Filed: Sep. 18, 2019

Related U.S. Application Data (63) Continuation of application No. 16/549,329, filed on Aug. 23, 2019, now abandoned.

(51) Int. Cl.
| | |
|---|---|
| *B64C 9/02* | (2006.01) |
| *B64D 29/02* | (2006.01) |
| *F02C 7/00* | (2006.01) |
| *B64D 27/12* | (2006.01) |

(52) U.S. Cl.
CPC ............. *B64D 29/02* (2013.01); *B64C 9/02* (2013.01); *B64D 27/12* (2013.01); *F02C 7/00* (2013.01); *F05D 2220/323* (2013.01)

(58) Field of Classification Search
CPC ........ B64D 29/02; B64D 27/12; B64D 27/00; B64D 27/08; B64C 9/02; B64C 7/00; B64C 7/02; B64C 23/06; F05D 2220/323
See application file for complete search history.

(56) References Cited

U.S. PATENT DOCUMENTS

| | | | | | |
|---|---|---|---|---|---|
| 2,257,940 | A | * | 10/1941 | Dornier ................... | B64C 11/00 244/53 R |
| 2,306,015 | A | * | 12/1942 | Dornier ..................... | B64C 9/18 244/216 |
| 2,744,745 | A | * | 5/1956 | Engelhard .............. | C21D 9/665 266/255 |
| 2,969,935 | A | * | 1/1961 | Price ................... | B64C 29/0033 244/7 C |
| 3,744,745 | A | * | 7/1973 | Kerker ...................... | B64C 7/02 244/199.1 |
| 4,796,424 | A | * | 1/1989 | Farrar ....................... | F02C 7/04 244/69 |
| 9,429,072 | B2 | | 8/2016 | Diaz et al. | |
| 9,533,754 | B2 | * | 1/2017 | Ferguson ................ | B64C 23/00 |
| 9,803,557 | B2 | | 10/2017 | Farah et al. | |
| 9,945,325 | B2 | | 4/2018 | Roberge | |
| 9,982,630 | B2 | | 5/2018 | Marini et al. | |
| 10,294,822 | B2 | | 5/2019 | Caruel et al. | |
| 2003/0150955 | A1 | * | 8/2003 | Daggett ................... | B64C 21/00 244/57 |
| 2008/0267762 | A1 | * | 10/2008 | Jain .......................... | B64C 23/00 415/2.1 |
| 2018/0312241 | A1 | * | 11/2018 | Alber ..................... | B64C 39/024 |

FOREIGN PATENT DOCUMENTS

GB 2203105 A * 10/1988 ............. B64D 27/18

\* cited by examiner

*Primary Examiner* — Medhat Badawi
*Assistant Examiner* — Vicente Rodriguez
(74) *Attorney, Agent, or Firm* — Carlson, Gaskey & Olds, P.C.

(57) ABSTRACT

A gas turbine engine according to an exemplary aspect of the present disclosure includes, among other things, an engine wing. This disclosure also relates to an airplane including an engine wing.

16 Claims, 6 Drawing Sheets

ENGINE WING

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

SUMMARY

A gas turbine engine according to an exemplary aspect of the present disclosure includes, among other things, an engine wing.

In a further non-limiting embodiment of the foregoing gas turbine engine, the engine wing is a first engine wing, and the gas turbine engine includes a second engine wing arranged on an opposite side of the gas turbine engine as the first engine wing.

In a further non-limiting embodiment of any of the foregoing gas turbine engines, the gas turbine engine includes a fan and a fan case surrounding the fan. Further, the first engine wing and the second engine wing project radially outward from the fan case.

In a further non-limiting embodiment of any of the foregoing gas turbine engines, the gas turbine engine includes a nacelle surrounding the fan case, and the first engine wing and second engine wing project radially outward beyond the nacelle.

In a further non-limiting embodiment of any of the foregoing gas turbine engines, the nacelle includes a first cutout configured to permit the first engine wing to project radially outward from the nacelle and a second cutout configured to permit the second engine wing to project radially outward from the nacelle.

In a further non-limiting embodiment of any of the foregoing gas turbine engines, the first engine wing and the second engine wing project radially outward from a respective side of the nacelle by a distance within a range between 0.30 and 0.74 of a diameter of the fan.

In a further non-limiting embodiment of any of the foregoing gas turbine engines, the distance is about 0.59 of the diameter of the fan.

In a further non-limiting embodiment of any of the foregoing gas turbine engines, the first engine wing and second engine wing are airfoil-shaped in cross-section.

In a further non-limiting embodiment of any of the foregoing gas turbine engines, the first engine wing and the second engine wing have a first chord adjacent the nacelle and a second chord less than the first chord adjacent respective tips of the first engine wing and the second engine wing.

In a further non-limiting embodiment of any of the foregoing gas turbine engines, the first chord is about 0.46 of the diameter of the fan and the second chord is about 0.30 of the diameter of the fan.

In a further non-limiting embodiment of any of the foregoing gas turbine engines, the cross-section of the first engine wing and second engine wing has a maximum thickness within a range of 0.04 to 0.12 of the chord of the respective first engine wing and second engine wing.

In a further non-limiting embodiment of any of the foregoing gas turbine engines, leading edges of the first engine wing and the second engine wing are swept aft relative to a plane normal to an engine central longitudinal axis by about 15 degrees.

In a further non-limiting embodiment of any of the foregoing gas turbine engines, the gas turbine engine includes a geared architecture connecting a fan to a shaft of the gas turbine engine such that the fan is driven at a lower speed than the shaft.

An airplane according to an exemplary aspect of the present disclosure includes, among other things, an engine wing projecting outward of a housing surrounding a gas turbine engine.

In a further non-limiting embodiment of the foregoing airplane, the airplane includes a fuselage and first and second wings projecting from the fuselage. The first and second wings are configured to generate a lifting force to support the airplane in flight.

In a further non-limiting embodiment of any of the foregoing airplanes, the engine wing is a first engine wing projecting from the housing of the gas turbine engine, and the airplane includes a second engine wing projecting from the housing of the gas turbine engine.

In a further non-limiting embodiment of any of the foregoing airplanes, the gas turbine engine is a first gas turbine engine, and the airplane includes a third engine wing and a fourth engine wing projecting from a housing of a second gas turbine engine.

In a further non-limiting embodiment of any of the foregoing airplanes, the first gas turbine engine is mounted to the first wing and the second gas turbine engine is mounted to the second wing.

In a further non-limiting embodiment of any of the foregoing airplanes, the engine wing projects radially outward beyond a nacelle.

In a further non-limiting embodiment of any of the foregoing airplanes, wherein a heat exchanger is mounted within the engine wing.

DETAILED DESCRIPTION

Figure 1:
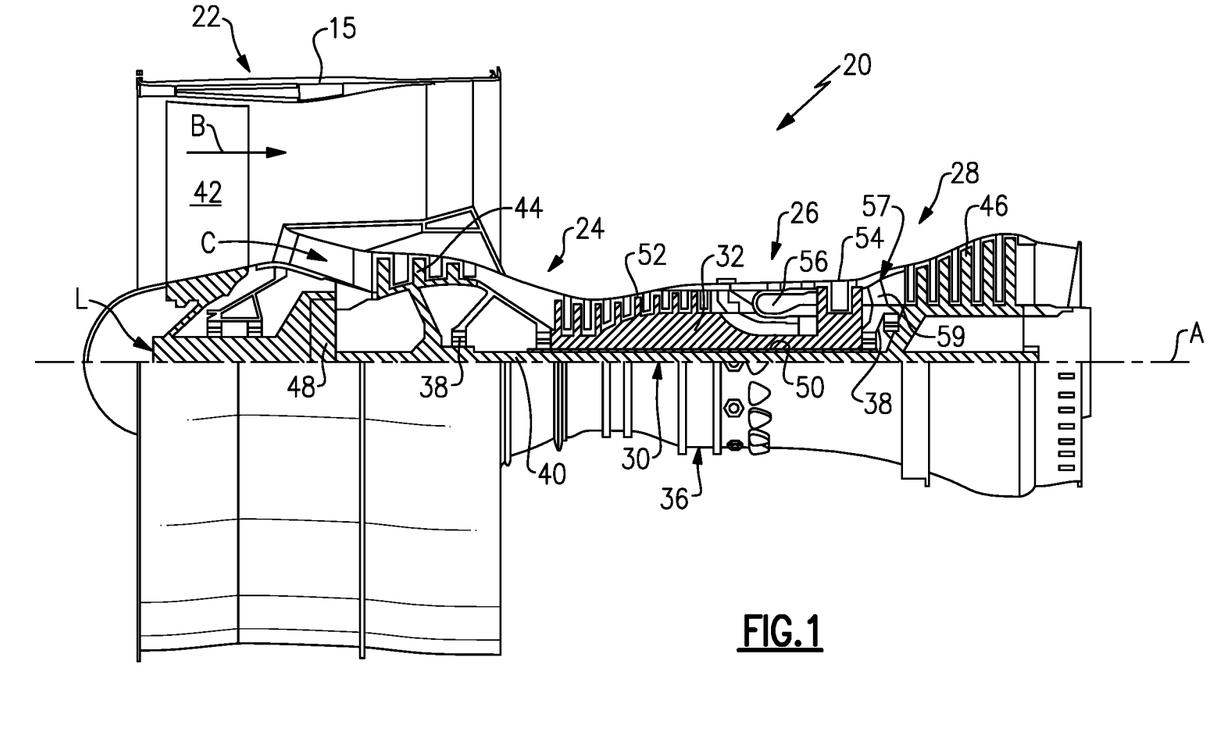
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, low bypass engines, and multi-stage fan engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 meters/second).

Figure 2:
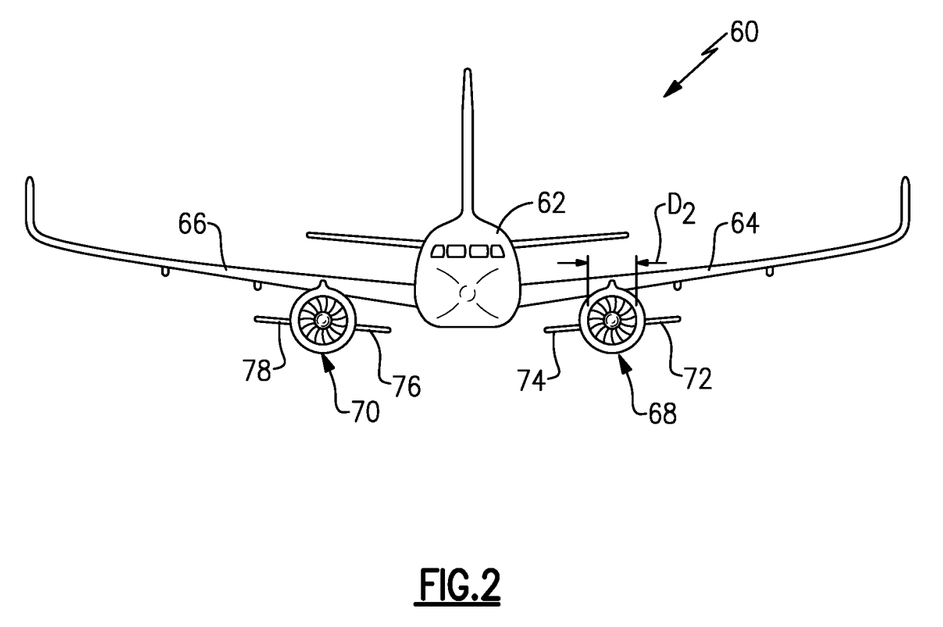
FIG. 2 illustrates an airplane from a front view.

FIG. 2 illustrates an airplane 60 including a fuselage 62, first and second wings 64, 66 projecting from the fuselage 62 and configured to generate a lifting force to support the airplane 60 in flight. In this example, the airplane 60 includes two gas turbine engines, namely a first gas turbine engine 68 mounted below the first wing 64 and a second gas turbine engine 70 mounted below the second wing 66.

The first and second gas turbine engines 68, 70 may be configured substantially similar to the gas turbine engine 20. In particular, the first and second gas turbine engines 68, 70 may each include a geared architecture, substantially similar to geared architecture 48, for example, connecting a fan of the respective gas turbine engine 68, 70 to a shaft of the respective gas turbine engine 68, 70. As such, in the gas turbine engines 68, 70, the fans are driven at a lower speed than the shaft, such as a low speed spool. As will be appreciated from the below, this disclosure has particular benefits in the context of gas turbine engines which include a geared architecture, however this disclosure may be used relative to other types of gas turbine engines, including those without a geared architecture.

While a geared architecture has known benefits, it may add weight relative to a gas turbine engine that is similarly sized but without a geared architecture. In this disclosure, at least one engine wing projects from the gas turbine engines. In particular, in FIG. 2, first and second engine wings 72, 74 project radially outwardly from opposite sides of the first gas turbine engine 68, and third and fourth engine wings 76, 78 project radially outwardly from opposite sides of the second gas turbine engine 70. While four engine wings are shown in FIG. 2, this disclosure extends to gas turbine engines and airplanes with one or more engine wings. Details of the engine wings will be described below.

Figure 3:
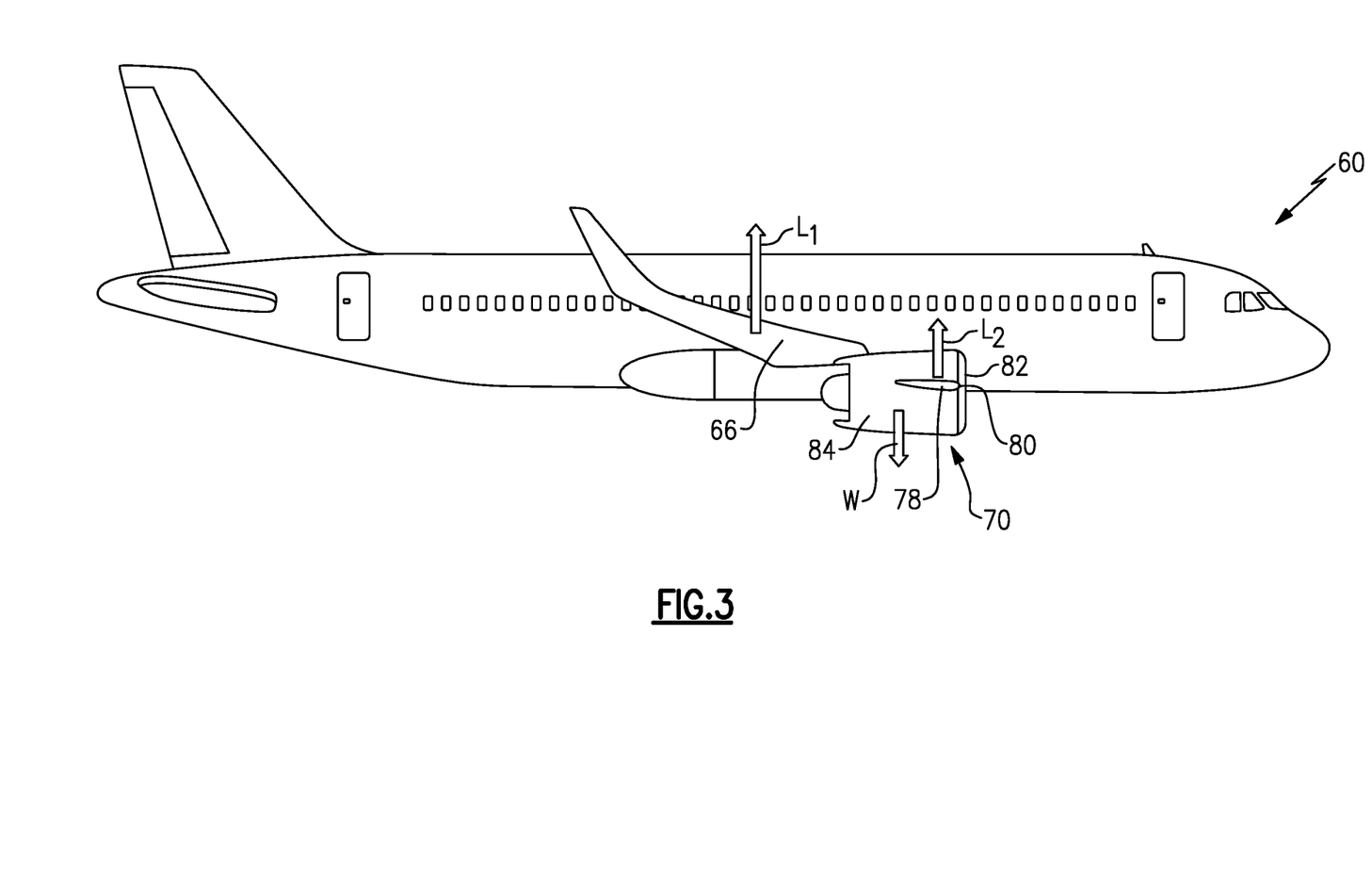
FIG. 3 illustrates the airplane from a side view.

The engine wings 72, 74, 76, 78 are configured to produce lift while the airplane 60 moves through the air. Specifically, the engine wings 72, 74, 76, 78 are configured to produce an amount of lift that offsets at least some of the weight of the gas turbine engines 68, 70, such as any increased weight that may be attributable to the presence of a geared architecture. FIG. 3 is representative of the lifting force $L_1$ produced by the wing 66, lifting force $L_2$ produced by engine wing 78, and the weight W of the gas turbine engine 70. Here, again, the lifting force $L_2$ at least partially offsets the weight W.

In general, the engine wings 72, 74, 76, 78 are distinguishable from various known aircraft and engine structures such as propellers, airfoils (i.e., blades or vanes), and strakes. A propeller is configured to rotate about an engine central longitudinal axis during operation, whereas the engine wings 72, 74, 76, 78 are not. Airfoils, such as blades or vanes, are arranged substantially within a gas turbine bypass flow path in a bypass duct or in a core flow path, whereas the engine wings 72, 74, 76, 78 are not. And while some engines include fin-like strakes projecting outwardly from a nacelle, those strakes are not configured to produce lift. Rather, strakes are configured to produce a vortex that flows over top of a wing and maintains attached flow.

As shown in FIG. 3, the fore-most edge 80 of the engine wing 78 is adjacent a fore-most edge 82 of a housing 84 surrounding the gas turbine engine 70. The housing 84 may be a nacelle or a portion of a nacelle such as a fan or inlet cowl. Positioning the engine wings in a forward location relative to the gas turbine engines is beneficial particularly in applications where the gas turbine engines include a geared architecture, which is typically located toward the forward end of the engine. Thus, the engine wings are able to produce a lifting force which serves to more evenly distribute the weight of the gas turbine engine.

Figure 4:
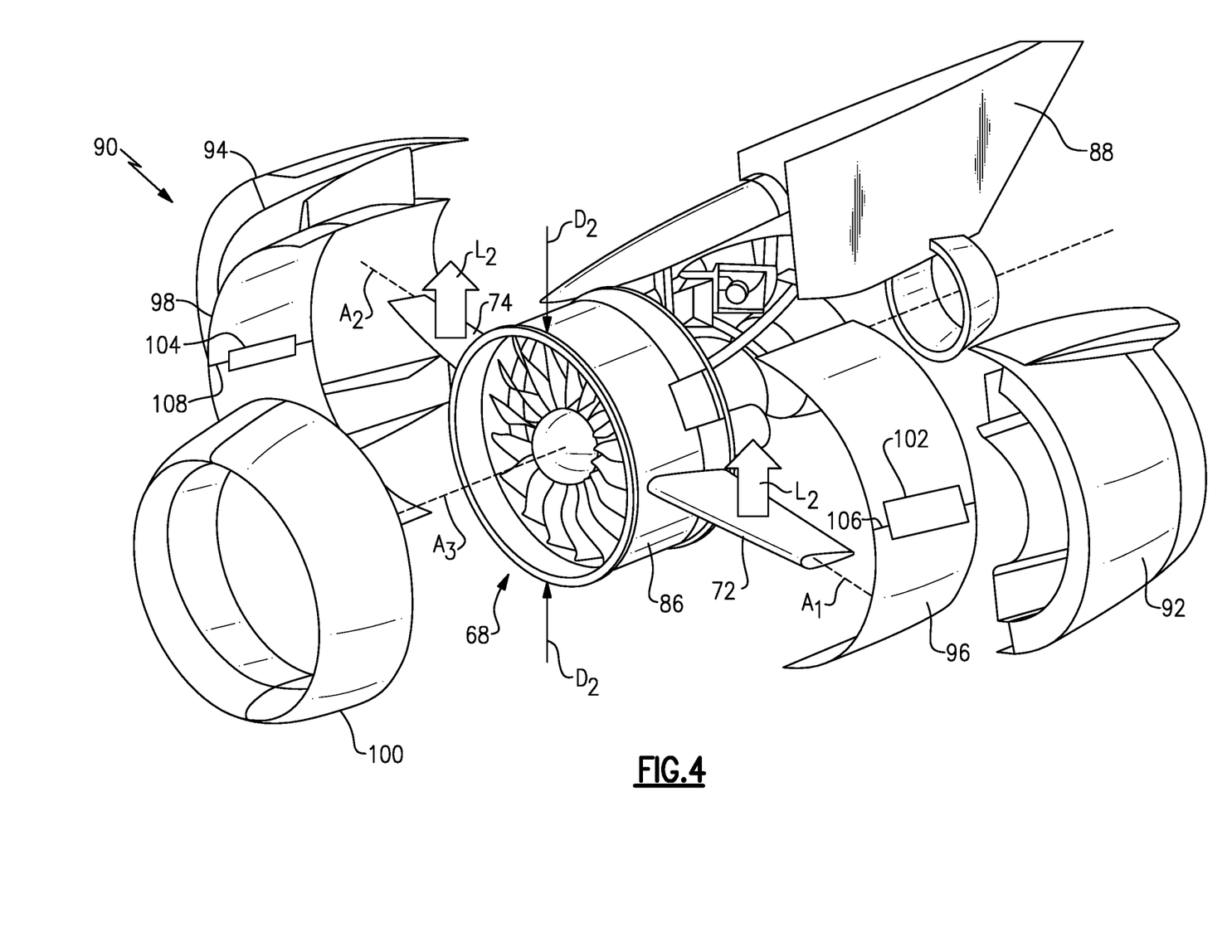
FIG. 4 illustrates an example gas turbine engine with the nacelle shown in an exploded view.

In one example of this disclosure, the engine wings are directly mounted to a gas turbine engine. With reference to FIG. 4, the engine wings 72, 74 are directly mounted to a housing 86 of the gas turbine engine 68. The engine wings 76, 78 are mounted similarly to the gas turbine engine 70. The housing 86 is substantially similar to the housing 15 described relative to FIG. 1, and in particular is a fan case surrounding a fan of the gas turbine engine 68 in this example.

In one example, the engine wings 72, 74 are rigidly attached to the housing 86 by welding, for example. In another example, the engine wings 72, 74 have a variable pitch and are rotatable relative to the housing 86 by rotation about respective longitudinal axes $A_1$, $A_2$, which extend in a generally port-starboard direction substantially normal to the engine central longitudinal axis $A_3$ of the gas turbine engine 68.

The gas turbine engine 68 may be mounted to the wing 64 by way of a pylon 88. Further, when mounted to the wing 64, the gas turbine engine 68 may be surrounded by nacelle 90, various components of which are shown in an exploded view in FIG. 4. The nacelle 90, in this example, includes first and second thrust reverser sections 92, 94, first and second fan cowl sections 96, 98, and an inlet cowl 100. In this disclosure, to accommodate the engine wings 72, 74, the first and second fan cowl sections 96, 98 include cutouts 102, 104 permitting the engine wings 72, 74 to project radially, relative to the engine central longitudinal axis $A_3$ outward beyond the nacelle 90. Each first and second fan cowl section 96, 98 may be configure to separate at a seam 106, 108 adjacent the respective cutout 102, 104 such that the first and second fan cowl sections 96, 98 can be opened for engine maintenance, for example, without interfering with the engine wings 72, 74.

The size of the engine wings 72, 74, 76, 78 will now be described relative to FIG. 5 and engine wing 72. It should be understood that the engine wings 74, 76, 78 are sized and arranged substantially similar to engine wing 72. In this disclosure, the size of the engine wing 72 is configured to provide a lift force that serves to counteract the weight of the gas turbine engine 68 and, in effect, distributes the weight of the geared architecture, which would otherwise be weighted toward a forward portion of the gas turbine engine 68.

Figure 5:
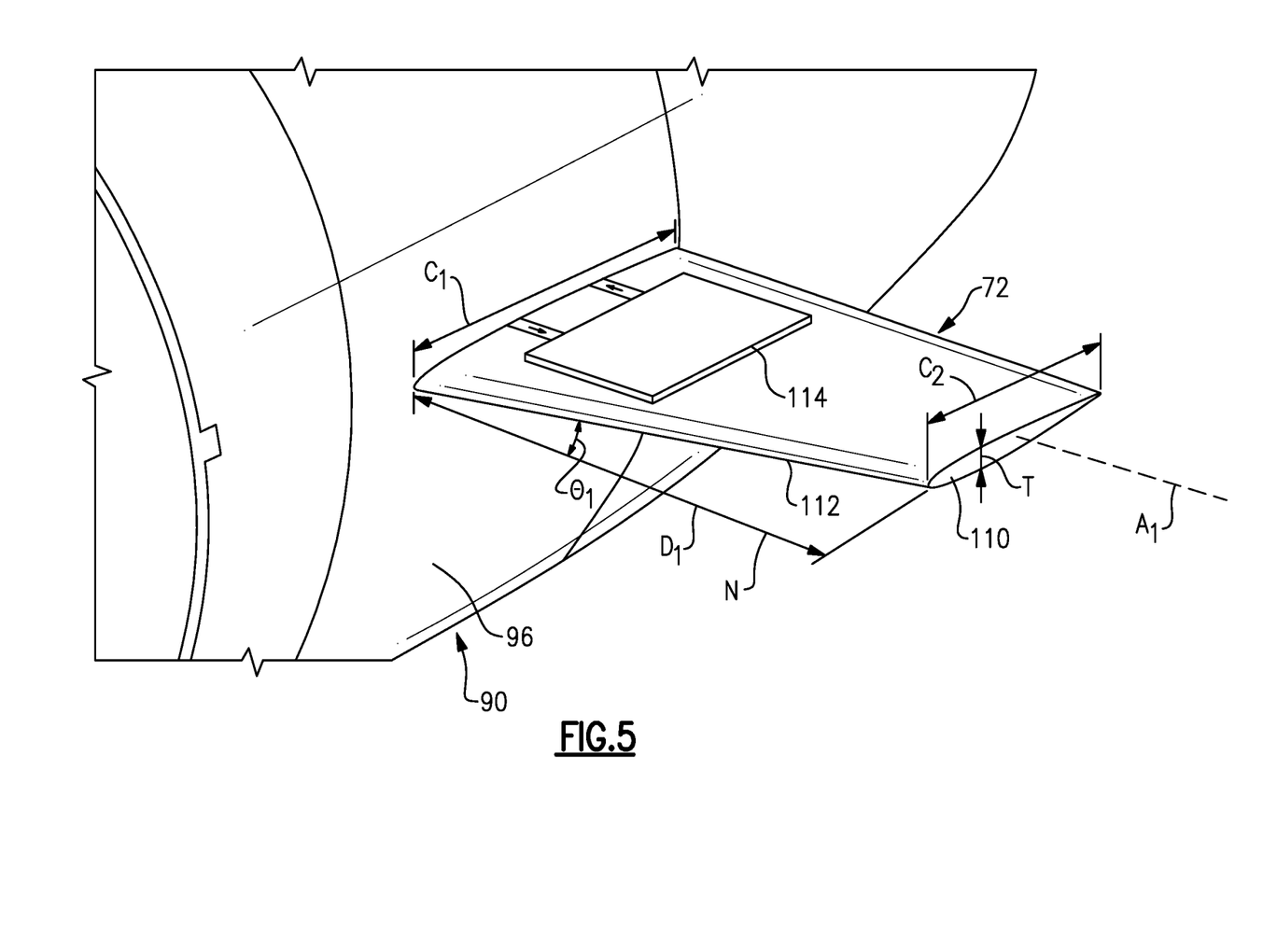
FIG. 5 illustrates a portion of the example gas turbine engine, and in particular illustrates the arrangement of an example engine wing.

In the example of FIG. 5, the engine wing 72 projects radially outward from the nacelle 90, namely the fan cowl section 96, by a distance $D_1$ within a range between 0.30 and 0.74 of (i.e., multiplied by) a diameter of the fan $D_2$ (FIG. 4). The diameter of the fan $D_2$ in this example is an inner diameter of the housing 86 and $D_2$ may alternatively be the inner diameter of the nacelle 90. In a particular example, the distance $D_1$ is about 0.59 of the diameter of the fan $D_2$.

The engine wings 72, 74, 76, 78 are airfoil-shaped in cross-section. In particular, in the example of FIG. 5, the engine wing 72 has a first chord $C_1$ adjacent the nacelle 90 and a second chord $C_2$ less than the first chord $C_1$ adjacent a tip 110 of the engine wing 72. Further, the first chord $C_1$ is about 0.46 of the diameter of the fan $D_2$ and the second chord $C_2$ is about 0.30 of the diameter of the fan $D_2$. While the first chord $C_1$ is typically greater than the second chord $C_2$, either can be within range of 0.35 to 0.58 of a diameter of the fan $D_2$ in other examples. Further, in cross-section, the engine wing 72 has a maximum thickness T within a range of 0.04 to 0.12 of the chord of the engine wing 72 at that particular location along the longitudinal axis $A_1$. In one example, the maximum thickness is about 0.08 of the chord at a particular location along the longitudinal axis $A_1$.

In FIG. 5, a leading edge 112 of the engine wing 72 is swept aft relative to a plane normal N to an engine central longitudinal axis $A_3$ by an angle $\theta_1$ of about 15 degrees. The angle $\theta_1$ can be anywhere from 0 to 25 degrees in other examples.

Given the size and location of the engine wings 72, 74, 76, 78, various components of the gas turbine engines 68, 70 can be advantageously arranged in the engine wings 72, 74, 76, 78. An example component 114 is shown in FIG. 5. The component may be an electronic, mechanical, or electromechanical component which is electronically and/or fluidly connected to various other components of the gas turbine engine 68. The component 114 can include an oil tank, or a heat exchanger such as an air-oil cooler or a fuel-air cooler, a variable frequency generator, and/or other components. The arrangement of the engine wing 72 radially outside the nacelle 90 makes the engine wing 72 effective as a heat sink.

Figure 6A:
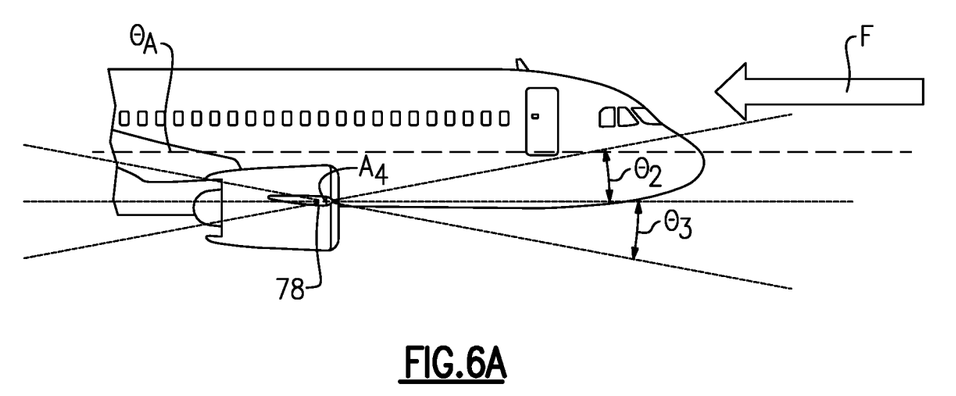
FIG. 6A illustrates an example variable pitch engine wing and an airplane in a cruise condition.

As mentioned above, the engine wings 72, 74, 76, 78 may be variable pitch. FIG. 6A illustrates an example in which the engine wing 78 is a variable pitch engine wing and is configured to rotate about a longitudinal axis $A_4$ extending along the length of the engine wing 78 in the generally port-starboard direction. It should be understood that the engine wings 72, 74, 76 may be similarly configured.

In FIG. 6A, the airplane 60 is in a cruise condition. With reference to FIG. 6A, the engine wing 78 is configured to rotate about axis $A_4$ in a counterclockwise direction by an angle $\theta_2$ of up to 10° and in a clockwise direction by an angle $\theta_3$ of up to 10° relative to the angle of attack $\theta_A$ of the airplane 60. In FIG. 6A, the angle of attack $\theta_A$ is substantially zero and is substantially parallel to freestream flow F.

Figure 6B:
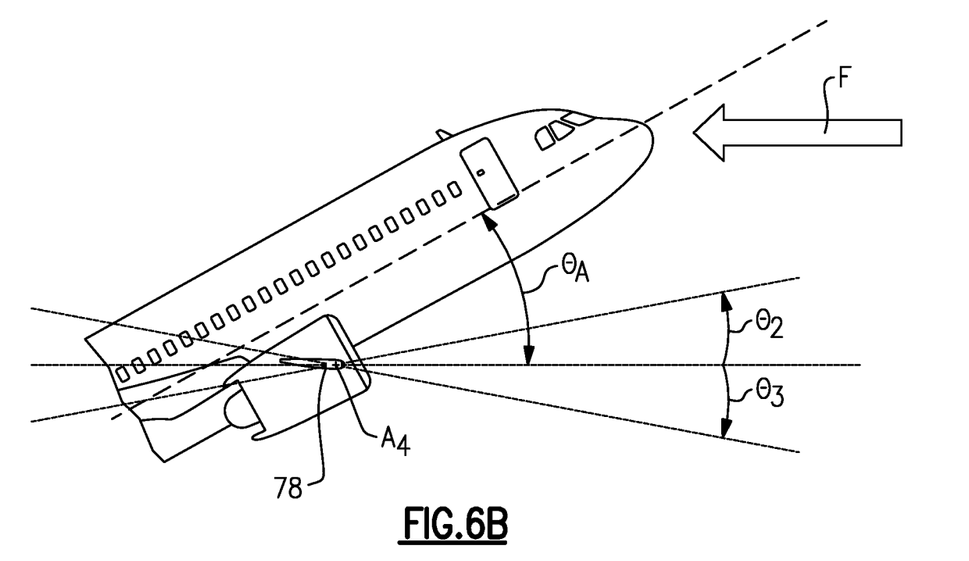
FIG. 6B illustrates the example variable pitch engine wing and the airplane in a climb condition.

FIG. 6B illustrates the engine wing 78 with the airplane 60 in a climb condition in which the angle of attack $\theta_A$ of the airplane 60 is about 29° relative to the freestream flow F. Again, the engine wing 78 may be rotated 10° in either a clockwise or counterclockwise direction by up to 10° relative to the freestream flow F. While 10° is mentioned, this disclosure extends to other angles of rotation of the engine wings.

It should be understood that terms such as "axial," "radial," and "circumferential" are used above with reference to the normal operational attitude of the engines 20, 68, and/or 70. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various FIGS. accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising:
a first engine wing;
a second engine wing arranged on an opposite side of the gas turbine engine as the first engine wing;
a fan;
a fan case surrounding the fan, wherein the first engine wing and the second engine wing project radially outward from the fan case; and
a nacelle surrounding the fan case, wherein the first engine wing and second engine wing project through the nacelle and radially outward beyond the nacelle.

2. The gas turbine engine as recited in claim 1, wherein the nacelle includes a first cutout configured to permit the first engine wing to project radially outward from the nacelle and a second cutout configured to permit the second engine wing to project radially outward from the nacelle.

3. The gas turbine engine as recited in claim 1, wherein the first engine wing and the second engine wing project radially outward from a respective side of the nacelle by a distance within a range between 0.30 and 0.74 of a diameter of the fan.

4. The gas turbine engine as recited in claim 3, wherein the distance is about 0.59 of the diameter of the fan.

5. The gas turbine engine as recited in claim 1, wherein the first engine wing and the second engine wing are airfoil-shaped in cross-section.

6. The gas turbine engine as recited in claim 5, wherein the first engine wing and the second engine wing have a first chord adjacent the nacelle and a second chord less than the first chord adjacent respective tips of the first engine wing and the second engine wing.

7. The gas turbine engine as recited in claim 6, wherein the first chord is about 0.46 of the diameter of the fan and the second chord is about 0.30 of the diameter of the fan.

8. The gas turbine engine as recited in claim 5, wherein the cross-section of the first engine wing and second engine wing has a maximum thickness within a range of 0.04 to 0.12 of the chord of the respective first engine wing and second engine wing.

9. The gas turbine engine as recited in claim 1, wherein leading edges of the first engine wing and the second engine wing are swept aft relative to a plane normal to an engine central longitudinal axis by about 15 degrees.

10. The gas turbine engine as recited in claim 1, further comprising a geared architecture connecting a fan to a shaft of the gas turbine engine such that the fan is driven at a lower speed than the shaft.

11. An airplane, comprising:
an engine wing projecting outward of a housing surrounding a gas turbine engine;
a fuselage;
first and second wings projecting from the fuselage and configured to generate a lifting force to support the airplane in flight, wherein the gas turbine engine is mounted beneath one of the first and second wings, wherein the engine wing projects through a nacelle and radially outward beyond the nacelle, and wherein the engine wing projects radially outward from a fan case surrounding a fan of the gas turbine engine.

12. The airplane as recited in claim 11, wherein the engine wing is a first engine wing projecting from the housing of the gas turbine engine, and wherein the airplane includes a second engine wing projecting from the housing of the gas turbine engine.

13. The airplane as recited in claim 12, wherein the gas turbine engine is a first gas turbine engine, and the airplane includes a third engine wing and a fourth engine wing projecting from a housing of a second gas turbine engine.

14. The airplane as recited in claim 13, wherein the first gas turbine engine is mounted to the first wing and the second gas turbine engine is mounted to the second wing.

15. The airplane as recited in claim 11, wherein a heat exchanger is mounted within the engine wing.

16. The airplane as recited in claim 14, wherein the first gas turbine engine is mounted below the first wing and the second gas turbine engine is mounted below the second engine wing.

* * * * *